United States Patent [19]
Hartwig et al.

[11] Patent Number: 5,662,055
[45] Date of Patent: Sep. 2, 1997

[54] PROGRAM-CONTROLLED SEWING OR EMBROIDERY MACHINE AND METHOD OF OPERATING SUCH MACHINES

[75] Inventors: Jürgen Hartwig, Pforzhein; Christof Reichmann, Karlsruhe, both of Germany

[73] Assignee: G.M. PFAFF Aktiengesellschaft, Kaiserslautern, Germany

[21] Appl. No.: 587,575

[22] Filed: Jan. 17, 1996

[30] Foreign Application Priority Data

Jan. 17, 1995 [DE] Germany ............ 195 01 117.5

[51] Int. Cl.$^6$ .............. D05B 19/06; D05B 19/12; D05C 5/02
[52] U.S. Cl. .............. 112/102.5; 112/470.04; 112/475.19; 364/470.09
[58] Field of Search .............. 112/470.04, 470.06, 112/470.01, 475.05, 475.19, 456, 457, 102.5; 364/470, 470.07, 470.08, 470.09

[56] References Cited

U.S. PATENT DOCUMENTS

| 5,255,198 | 10/1993 | Yokoe et al. | 112/102.5 X |
| 5,313,896 | 5/1994 | Hashiride | 112/470.04 X |
| 5,390,126 | 2/1995 | Kongho et al. | 112/470.04 X |

FOREIGN PATENT DOCUMENTS

| 3338153 | 10/1983 | Germany. |
| 3527465 | 7/1985 | Germany. |
| 4105089 | 2/1991 | Germany. |

*Primary Examiner*—Peter Nerbun

[57] ABSTRACT

A program-controlled sewing or embroidery machine comprising a stitch-forming device (2), an integrated microcomputer (4), at least one memory (16, 17) and at least one data interface (5), as well as a keyboard (12) and a display (11) for entering and monitoring or checking values for program control. To retrieve sewing or embroidery pattern data from a remote computer (mailbox) in a simple manner, the data interface (5) of the sewing or embroidery machine (1) is able to be connected directly to the mailbox (10) of a central computer (9) via a data transmission connection (7) via a corresponding modem (6), and the structural units which are necessary for communication with the mailbox (10), such as display (11), keyboard (12) and memory (16, 17) are disposed in the sewing or embroidery machine (1) itself, with the functional processes necessary for communication with the mailbox (10) being able to be controlled and monitored by the microcomputer (4) necessary for controlling the program of the sewing or embroidery machine. The invention further relates to a method of operating program-controlled sewing or embroidery machines.

7 Claims, 1 Drawing Sheet

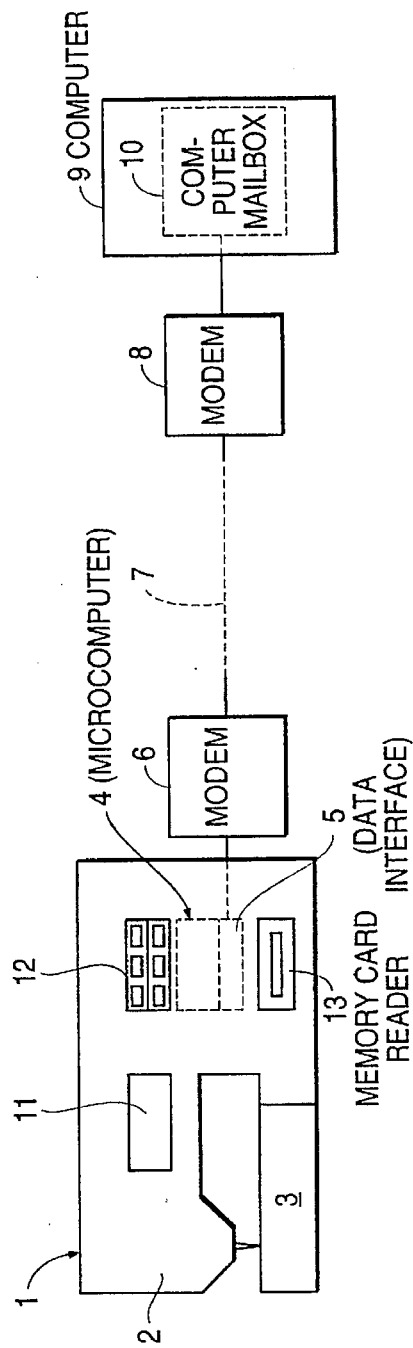
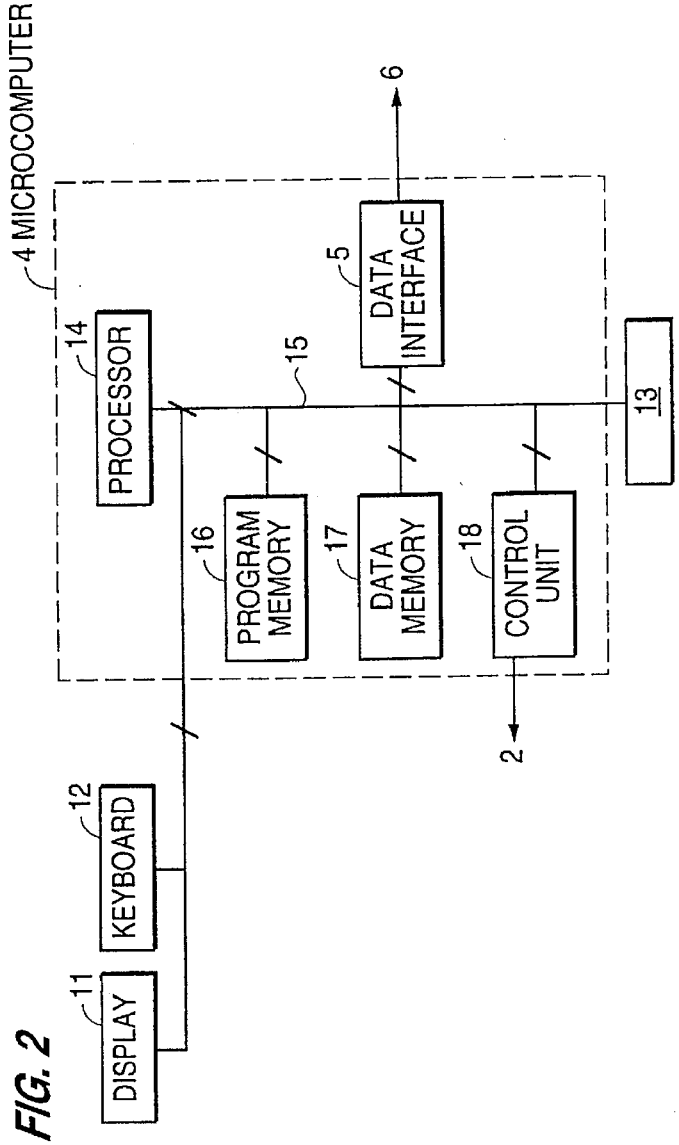

5,662,055

PROGRAM-CONTROLLED SEWING OR EMBOIDERY MACHINE AND METHOD OF OPERATING SUCH MACHINES

REFERENCE TO RELATED APPLICATIONS

This application claims the priority of German Patent Application Serial No. 19501177.5, filed Jan. 17, 1995, which is incorporated herein by reference.

BACKGROUND OF THE INVENTION

The invention relates to a program-controlled sewing or embroidery machine comprising a stitch-forming device, an integrated microcomputer, at least one memory and at least one data interface, as well as a keyboard and a display for entering and monitoring values for program control. The invention further relates to a method of operating such sewing or embroidery machines.

A sewing machine of the above general type is known from German Patent Application No. 1950177.5. It essentially comprises a device or machine part or portion which forms a stitch and supports, among others, the sewing needle, a feed unit having a stop apparatus for the sewn material, and an integrated microcomputer which controls and monitors or checks the functions of both the stitch-forming portion and the feed unit.

Page 7, lines 35 to 43 of DE 41 05 089 A1, further mentions that the microcomputer can also be connected via an interface to a communication device which includes a transmission channel this transmission channel can be a telephone line for example. However, from the above-mentioned published, non-examined German patent application, the purpose the transmission channel is intended to serve cannot be determined. In particular, the question remains unanswered whether the transmission channel represents a connection line between the input and output devices and an additional personal computer system (PC) mentioned in the patent application, which devices are disposed separately from the sewing machine.

It can be inferred from FIG. 1 of the above-mentioned German patent application that the external PC connected to the sewing machine is connected via a further communication device to a data line, possibly a telephone line. Hence, insofar as embroidery pattern data, for example, are to be copied from a remote database (mailbox) of a central computer to the sewing machine disclosed in DE 41 05 089 A1, these data must first be transmitted to the PC, modified there if necessary and subsequently loaded, by means of the microcomputer, into an internal or external memory of the sewing machine via the interface.

The primary drawback of this type of arrangement would be the relatively high equipment costs necessary for transmission of the externally-stored embroidery pattern data to the program-controlled sewing machine via a PC.

SUMMARY OF THE INVENTION

The primary object of the present invention is to provide a program-controlled sewing or embroidery machine of the type mentioned at the outset with which corresponding sewing or embroidery data can be retrieved from a remote computer (mailbox) and stored in a simple manner. Moreover, a further object is to provide a method for operating such a sewing or embroidery machines which makes it possible to prevent sewing or embroidery pattern data which have been stored on interchangeable storage cards by the sewing or embroidery machines from being copied without authorization onto other storage cards and/or used by third-party machines.

This above object with respect to the sewing or embroidery machine is achieved in accordance with the invention, by a program-controlled sewing or embroidery machine comprising a stitch-forming device, an integrated microcomputer, at least one memory, and at least one data interface, with the sewing or embroidery machine having a keyboard and a display for entering and monitoring or checking values for program control; and wherein the data interface of the sewing or embroidery machine can be connected directly to the mailbox of a central computer (9) via a data transmission connection, e.g., a telephone network or a radio link, via a corresponding connecting device, e.g., a modem or a radio transceiver, and those structural units which are necessary fox communication with the mailbox, such as the display, keyboard and memory, are disposed in the sewing or embroidery machine itself, and the functional processes necessary for communication with the mailbox can be controlled and monitored by the microcomputer necessary for controlling the program of the sewing or embroidery machine.

The above object with respect to the method is achieved according to the present invention, in that, to safeguard against unauthorized copying of the sewing or embroidery pattern data stored on the memory card by an external computer, a serial number which is characteristic of the program-controlled sewing or embroidery machine is stored in a memory of this machine; the microcomputer of the program-controlled sewing or embroidery machine formats the memory card prior to or during the storing of sewing or embroidery pattern data, copying the serial number of the sewing or embroidery machine onto the memory card in the process; the microcomputer of the corresponding sewing or embroidery machine, as it reads the memory card, first identifies the serial number of the memory card and compares this number with the serial number associated with the respective sewing or embroidery machine; and the microcomputer only performs the functional processes necessary for sewing or embroidering if the serial numbers of the sewing or embroidery machine and of the memory card match.

Further, particularly advantageous embodiments and modifications of the invention are disclosed.

The invention is essentially based on the concept of disposing all structural units necessary for communication with the remote mailbox, such as display, keyboard and memory devices, in the program-controlled sewing or embroidery machine itself, so that the sewing or embroidery machine can be connected directly to a telephone line by way of a(n internal or external) modem. The appropriate control and monitoring or functions for communication with the mailbox are effected by the microcomputer which is already present for program control of the sewing or embroidery machine.

In an advantageous modification of the invention, it is provided to additionally equip or provide the sewing or embroidery machine with a memory device which includes a card slot or reader for interchangeable storage cards, so-called memory cards, so that the sewing or embroidery pattern data retrieved from the mailbox can also be stored separately on a memory card.

In order to prevent the copying of data stored on the respective memory card, for example by means of a separate personal computer, according to further advantageous embodiment of the invention, a serial number which characterizes the sewing or embroidery machine is stored in a memory of the microcomputer of the sewing or embroidery machine, and together with the sewing or embroidery pattern data, this serial number is copied onto the memory card—typically in coded form. Furthermore, the microcomputer of the sewing or embroidery machine is designed such that, when it reads the corresponding sewing or embroidery pattern data from the corresponding memory card, it decodes the serial number which is stored on this memory card and compares it with the serial number associated with the corresponding sewing or embroidery machine. Only if the decoded number of the memory card matches the serial number of the corresponding sewing or embroidery machine is the corresponding machine enabled to sew or embroider the pattern stored on the memory card. Thus, while it is possible that the content of the memory card can be copied by a personal computer (PC), this copy, however, cannot be read by a third-party or different machine, because the two serial numbers do not match.

Further details and advantages of the invention ensue from the embodiment described below in conjunction with drawing figures.

BRIEF DESCRIPTION OF THE DRAWINGS

FIG. 1 schematically shows the connection of a sewing machine according to the invention to a remote computer via a telephone line.

FIG. 2 shows the block diagram of a preferred embodiment of a sewing machine microcomputer and associated circuitry according to the invention.

DETAILED DESCRIPTION OF THE PREFERRED EMBODIMENT

Shown in FIG. 1 is a program-controlled sewing machine which is indicated by i and essentially comprises a stitch-forming device part 2, a feed unit 3 and a microcomputer 4, indicated by a dashed line. Microcomputer 4 includes a data interface 5, for example, a serial data interface (e.g. an RS 232 or V 24 interface), which is connected, e.g., to a telephone line 7 via a modem 6. A remote computer 9 is likewise connected to the telephone line 7 via a modem 8. Computer 9 includes a database or mailbox 10 in which a plurality of sewing or embroidery pattern data are stored which can be selected or accessed by microcomputer 4 of sewing machine 1 via the telephone line 7.

Sewing machine 1 further includes a display indicated by 11 and a keyboard 12. These two structural units 11 and 12 are also provided in known program-controlled sewing machines for predetermining or selecting and monitoring or checking the stored programs. However, in the illustrated embodiment of the invention, the Units 11 and 12 are also utilized for communication, that is, for initiating the connection to mailbox 10, and during receiving and storing of the sewing or embroidery pattern data retrieved from the mailbox 10. Therefore, in comparison with known sewing machines, keyboard 12 has either additional keys, or it possesses the same construction as the keyboards of known sewing machines, but the individual keys are assigned a plurality of different functions in a known manner.

The sewing machine further includes a memory device 13 having a card slot or reader for memory cards, which is likewise connected to microcomputer 4, so that the sewing or embroidery pattern data retrieved from mailbox 10 by microcomputer 4 can also be stored externally on a memory card disposed in the device.

FIG. 2 shows a block diagram of microcomputer 4 with display 11, keyboard 12 and interface 5. Microcomputer 4 essentially comprises a processor 14, which is connected in a conventional manner via a bus 15 to display 11, keyboard 12, the memory device including card reader 13, and the interface 5. Microcomputer 4 further includes a program memory 16 for storing desired programs, a data memory 17 and a control unit 18 for actuating the sewing machine motor (not shown) which is associated with the stitch-forming device part 2 and the feed unit 3. For the sake of a better overview, further units that are not of great significance for explaining the invention (such as the microcomputer clock generator or the unit for actuating the feed unit, etc.) are not shown in FIG. 2.

The function of sewing machine 1 of the invention is explained below:

As an example, the user of sewing machine 1 utilizes a catalogue to search for a suitable embroidery pattern. The user subsequently selects the number (access code) of mailbox 10 with the aid of keyboard 12 of sewing machine 1, and then, also via the keyboard 12, enters his password and the number of the desired embroidery pattern from the catalogue. For purposes of monitoring and/or confirmation, the correspondingly entered values are displayed on display 11. The addressed mailbox 10 subsequently transmits the requested corresponding embroidery pattern data via telephone line 7 to sewing machine 1, where the data are stored in data memory 17 and, if need be or desired, also on the memory card inserted into the card slot of memory device 13.

In order to prevent the embroidery pattern data stored on the respective memory card from being copied arbitrarily, e.g., by means of a separate personal computer, etc., and passed on to third parties, the corresponding memory card is first formatted by microcomputer 4. To this end, a serial number associated with or identifying the particular sewing machine 1 and stored in its program, data or other memory 16, 17 is copied, in coded form, into the directory of the memory card, along with the sewing or embroidery pattern data. When microcomputer 4 reads the memory card, the microcomputer decodes the serial number stored on the card and compares this number to the serial number of the associated sewing machine 1 used for the reading. If the two serial numbers match, the stitch-forming device part 2 of the machine is correspondingly actuated via control unit 18. If, in contrast, the serial numbers do not match, the data stored on the memory card cannot be read or at least used by the sewing machine.

The invention is, of course, not limited to the described embodiment. Thus, for example, the telephone modem 6 on the side of the sewing machine can also be integrated into sewing machine 1. Moreover, the data transmission connection between sewing machine 1 and mailbox 10 can be an analog or a digital telephone line, but can also be a wireless (radio) connection in which case the modem would be replaced by a transceiver.

The invention now being fully described, it will be apparent to one of ordinary skill in the art that any changes and modifications can be made thereto without departing from the spirit or scope of the invention as set forth herein.

What is claimed:

1. A program-controlled sewing or embroidery machine comprising: a stitch-forming device; an integrated microcomputer, including at least one memory, for controlling the stitch forming device according to programs stored in the at least one memory, and at least one data interface for receiving and transmitting data; a keyboard and a display disposed on the sewing or embroidering machine, and connected to the microcomputer, for entering and monitoring values for program control; means for connecting paid data interface to a data transmission connection for direct connection to a mailbox of a central computer; wherein programs and functional processes necessary for communication with the mailbox via said means for connecting are stored in paid memory so that, using said keyboard and said display, communication with the mailbox necessary for controlling the program of the sewing or embroidery machine can be controlled and monitored by said microcomputer, and wherein said sewing or embroidery machine additionally has a memory device which includes a card slot reader for interchangeable memory cards, said card reader being connected to and controlled by said microcomputer so that sewing and embroidery pattern data can also be stored on and read from a memory card in said reader.

2. A program-controlled sewing or embroidery machine as defined in claim 1, wherein: a serial number which uniquely identifies the respective sewing or embroidery machine is stored in said memory of the sewing or embroidery machine; said microcomputer includes processing means for formatting a memory card in said reader prior to storage of a respective sewing or embroidery pattern on the memory card, for storing the serial number of the respective sewing or embroidery machine on the memory card in the formatting process, for initially identifying the serial number of the memory card during reading of a memory card and comparing the read memory card serial number with the serial number associated with the respective sewing or embroidery machine stored in said memory, and for producing an output signal indicating the result of the comparison; and, said microcomputer further includes control means, responsive to said output signal indicating the result of the comparison for activating said stitch-forming device part only if the serial number of the sewing or embroidery machine and the serial number stored on the memory card match.

3. A program-controlled sewing or embroidery machine as defined in claim 1, wherein said data interface of said sewing or embroidery machine is a serial interface.

4. A program-controlled sewing or embroidery machine comprising: a stitch-forming device; an integrated microcomputor, including at least one memory, for controlling the stitch forming device according to programs stored in the at least one memory, and at least one serial data interface for receiving and transmitting data; a keyboard and a display disposed on the sewing or embroidering machine, and connected to the microcomputer, for entering and monitoring values for program control; and a modem for connecting said data interface to a data transmission connection for direct connection to a mailbox of a central computer; and wherein programs and functional processes necessary for communication with the mailbox via said means for connecting are stored in said memory so that, using said keyboard and said display, communication with the mailbox necessary for controlling the program of the sewing or embroidery machine can be controlled and monitored by said microcomputer.

5. A program-controlled sewing or embroidery machine as defined in claim 4, wherein said data transmission connection is one of an analog and a digital telephone network.

6. A program-controlled sewing or embroidery machine comprising: a stitch-forming device; an integrated microcomputer, including at least one memory, for controlling the stitch forming device according to programs stored in the at least one memory, and at least one data interface for receiving and transmitting data; a keyboard and a display disposed on the sewing or embroidering machine, and connected to the microcomputer, for entering and monitoring values for program control; means for connecting said data interface to a data transmission connection for direct connection to a mailbox of a central computer; wherein programs and functional processes necessary for communication with the mailbox via said means for connecting are stored in said memory so that, using said keyboard and said display, communication with the mailbox necessary for controlling the program of the sewing or embroidery machine can be controlled and monitored by said microcomputer, and wherein said data transmission connection is a wireless radio network, and said means for connecting is a radio transceiver.

7. A method of safeguarding against unauthorized copying by an external computer of sewing or embroidery pattern data stored on a memory card of a program-controlled sewing or embroidery machine which comprises: a stitch-forming device; an integrated microcomputer, including at least one memory, for controlling the stitch forming device according to programs stored in the at least one memory, and at least one data interface for receiving and transmitting data; a keyboard and a display disposed on the sewing or embroidering machine, and connected to the microcomputer, for entering and monitoring values for program control; a memory device which includes a card slot reader for interchangeable memory cards, with the card reader being connected to and controlled by the microcomputer so that sewing and embroidery pattern data can be stored on and read from a memory card in the reader; and means for connecting the data interface to a data transmission connection for direct connection to a mailbox of a central computer; and wherein programs and functional processes necessary for communication with the mailbox via the means for connecting are stored in the memory so that, using the keyboard and the display, communication with the mailbox necessary for controlling the program of the sewing or embroidery machine can be controlled and monitored by the microcomputer; said method comprising the steps of:

storing a serial number which is characteristic of the program-controlled sewing or embroidery machine in the memory of the microcomputer of this machine; formatting the memory card, prior to or during the storing of sewing or embroidery pattern data, using the microcomputer of the program-controlled sewing or embroidery machine; copying the serial number of the sewing or embroidery machine onto the memory card during the formatting process; during reading of a memory card using the microcomputer of the corresponding sewing or embroidery machine, first identifying the serial number of the memory card and comparing this identified serial number with the serial number associated with the respective sewing or embroidery machine and stored in its memory; and permitting the microcomputer to perform the functional processes necessary, for sewing or embroidering of the stored pattern only if the serial numbers of the sewing or embroidery machine and of the memory card match.

* * * * *